May 19, 1970  J. F. ROBINSON  3,513,480
LOW STRESS BEARING

Filed April 26, 1967  7 Sheets-Sheet 1

INVENTOR.
JOHN F. ROBINSON
BY
ATTORNEY

May 19, 1970  J. F. ROBINSON  3,513,480
LOW STRESS BEARING

Filed April 26, 1967  7 Sheets-Sheet 4

INVENTOR.
JOHN F. ROBINSON
BY
*Philip M. Hinderer*
ATTORNEY

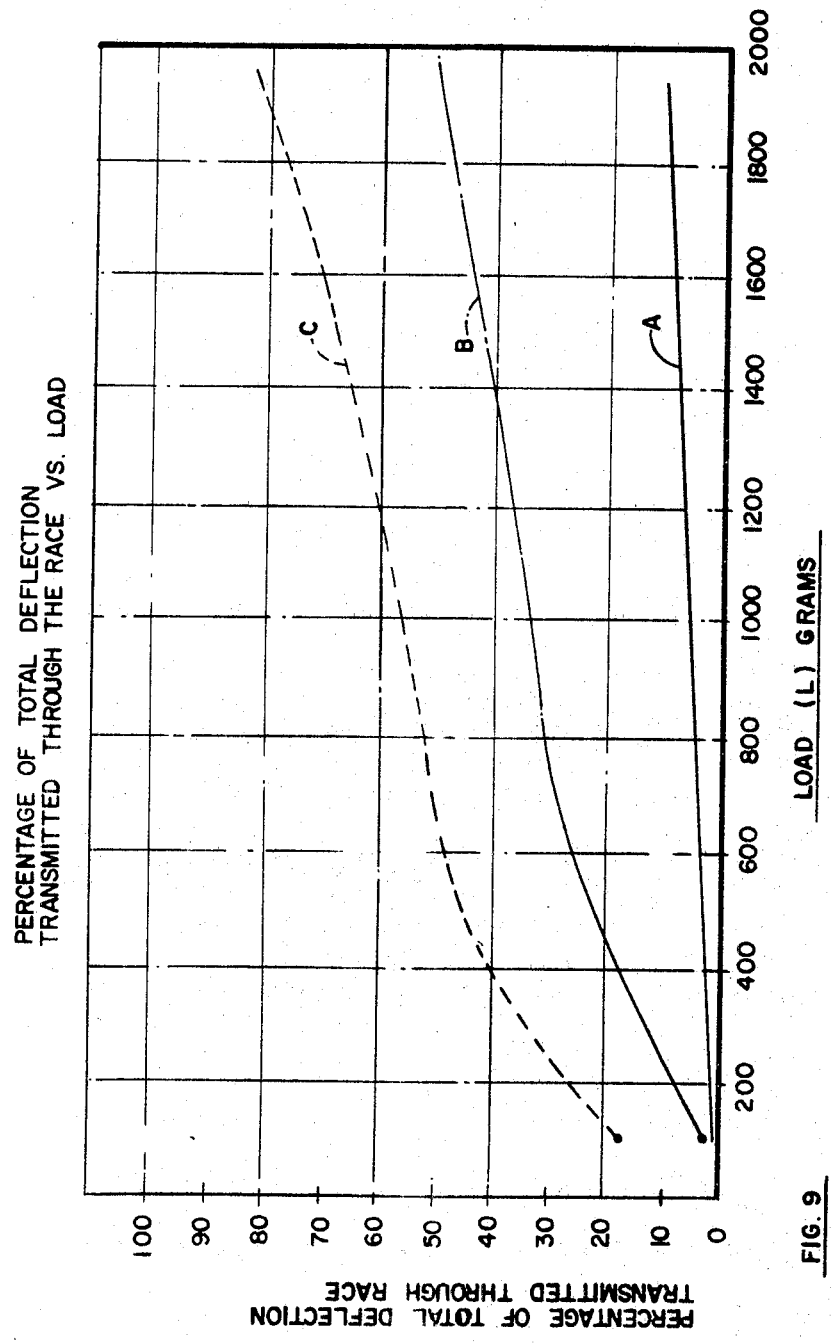

INVENTOR.
JOHN F. ROBINSON

May 19, 1970 J. F. ROBINSON 3,513,480
LOW STRESS BEARING

Filed April 26, 1967 7 Sheets-Sheet 7

INVENTOR.
JOHN F. ROBINSON
BY
*Philip M. Hinderstein*
ATTORNEY

United States Patent Office 3,513,480
Patented May 19, 1970

3,513,480
LOW STRESS BEARING
John F. Robinson, Newport Beach, Calif., assignor to North American Rockwell Corporation, a corporation of Delaware
Filed Apr. 26, 1967, Ser. No. 633,926
Int. Cl. F16c 27/00
U.S. Cl. 308—184                                    3 Claims

ABSTRACT OF THE DISCLOSURE

An anti-friction ball bearing assembly for reducing the level of Hertzian stresses in the raceways to thereby increase the life of the assembly in which the races are permitted to deflect to act as a beam by permitting a relief between the races and the shaft and/or the housing.

BACKGROUND OF THE INVENTION

Field of the invention

The present invention relates to anti-friction ball bearing devices and, more particularly, to a method and means for relieving the Hertzian stresses in a ball bearing assembly by permitting flexural bending of the races.

Description of the prior art

A typical anti-friction ball bearing assembly employs a series of spherical balls which are free to move in rolling engagement with opposed annular raceways to provide rotation of the races with respect to each other. In such a bearing in a no load condition, there is a very small area of contact between the ball and the raceways, this area usually approximating a point contact. In order to increase the contact area and to distribute the load more uniformly, a preload is usually placed on the bearing assembly. In addition, because of imperfections in the construction of the balls and the races and because of normal variations in the size of the balls, very heavy stress concentrations develop between the ball and the raceway. In view of these very heavy stress concentrations between the ball and the raceway under load and to provide for suitable operating capacities in anti-friction bearings, the material and hardness of the races and of the balls are preferably controlled so that the race will elastically compress under load to provide an even greater contact area between the ball and the raceway. However, after the races have repeatedly undergone a large number of such elastic deformations, the material of the races adjacent to the raceway surfaces fractures and flakes off causing rapid and often sudden bearing failure due to fatigue of the material of the race. The life of an anti-friction bearing depends upon many factors. With precision anti-friction bearings manufactured from the best obtainable materials, fatigue is a major cause of bearing failure. The bearing industry has spent many years of study and experimentation in an effort to reliably increase the fatigue life of anti-friction bearings. These prior attempts to increase the fatigue life have been in the direction of sophisticated improvements of materials, finishes, and lubricants, exacting control of geometrical configurations, controls on cleanliness in between the balls and the raceways and in protection of the bearings by sealing and shielding. However, even though some of these prior art attempts have resulted in significant increases in fatigue life, none have been able to increase fatigue life by several orders of magnitude as is possible with bearings constructed in accordance with the present invention.

SUMMARY OF THE INVENTION

It has been determined that a major contributing cause of fatigue in ball bearing assemblies is the Hertzian stresses which are localized under the surface of the raceway. Studies and tests have shown that fatigue of the metal where the Hertzian stresses are at a maximum is a major limiting factor in the life of a ball bearing assembly. Analytically, fatigue life of a bearing is inversely proportional to the Hertzian stresses to the ninth or tenth power. It can therefore be appreciated that a small decrease in the Hertzian stresses will drastically increase fatigue life. According to the present invention, the Hertzian stresses are significantly reduced by permitting the race of the bearing assembly to deflect ever so slightly to thereby distribute the load on the bearing over a greater volume of the bearing race material. Furthermore, this slight deflection permits the adjacent balls to assume a portion of the load which further reduces the maximum stresses in the race.

OBJECTS

It is, therefore, an object of the present invention to provide a method and means for relieving the Hertzian stresses in a ball bearing assembly.

It is a further object of the present invention to provide a method and means for relieving the Hertzian stresses in a ball bearing assembly by permitting flexure of the bearing races.

It is a still further object of the present invention to provide a method and means for increasing the contact area between the ball and the raceway in a ball bearing assembly by permitting flexure of the race.

It is another object of the present invention to provide a method and means for reducing the maximum stresses in the race of a ball bearing assembly by providing for a more uniform stressing of the entire race.

It is still another object of the present invention to provide a method and means for establishing uniform ball-raceway contact in a ball bearing assembly.

Another object of the present invention is a method and means for lowering the preload in a ball bearing assembly.

Still another object of the present invention is a method and means for providing lifetime lubrication of a ball bearing assembly.

Still other objects, features and attendant advantages of the present invention will become apparent to those skilled in the art from a reading of the following detailed description of several embodiments constructed in accordance therewith taken in conjunction with the accompanying drawings, wherein:

BRIEF DESCRIPTION OF THE DRAWINGS

FIG. 9 is a family of curves showing the percentage of total deflection transmitted through a race as a function of the load on the ball;

DESCRIPTION OF THE PREFERRED EMBODIMENTS

It is well known to those skilled in the art that very heavy stress concentrations exist between the ball and the race under load in a ball bearing assembly. These stresses are commonly known as Hertzian stresses. Studies and tests have shown that fatigue of the metal in areas where the Hertzian stresses are a maximum is a major limiting factor in the life of a ball bearing assembly.

Figure 1:
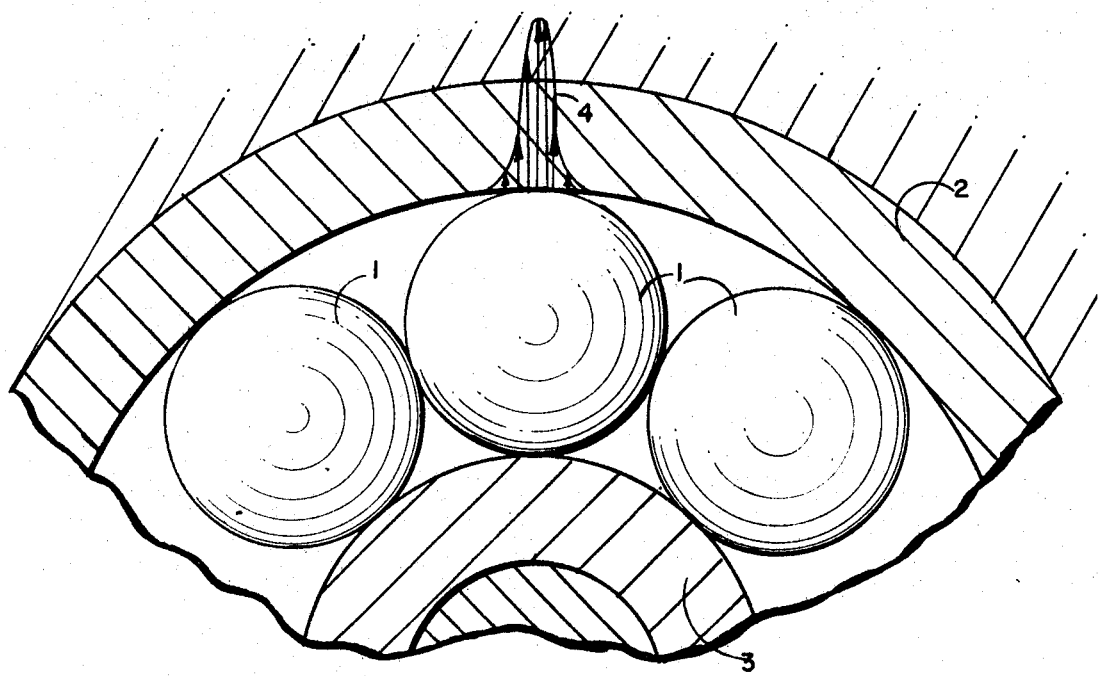
FIG. 1 is schematic view of a typical ball bearing assembly showing the Hertzian stress distribution in the races.

Referring now to FIG. 1, there is shown a conventional ball bearing assembly including a plurality of balls 1, an outer race 2 and an inner race 3. In manufacturing the balls for such a bearing, it is impossible to construct each of the balls with the exact same outside diameter. Typically, the diameters of the balls differ by as much as 10 microinches. Therefore, in order to insure that all of balls 1 are originally in contact with both of races 2 and 3, the bearings are preloaded using any one of a number of conventional preloading techniques. In a preloaded bearing, the balls and races are under a certain degree of compression when installed in a housing. Such a bearing is useful especially in precision instruments where lost motion in the bearing must be avoided so that the rotating parts will remain accurately centered at all times An ordinary ball bearing assembly, that is., one which is not preloaded, will, under load, develop some lost motion, depending upon the relation of the load to the size of the bearing, the compressibility of the metal and the tolerances of the parts. By preloading the bearing, the lost motion resulting from a given size is materially reduced. However, the result of preloading the bearing may be seen from FIG. 1. Assume, as is usually the case, that there is at least one point along the circumference of the outer or inner raceway where the spacing between the raceways is at a minimum. It can be appreciated that every time one of the balls passes through this space, the races will be elastically compressed and there will be high peak stresses induced at this point. Furthermore, the greater the diameter of the individual ball the greater is the level of these Hertzian stresses. The distribution of the Hertzian stresses is shown as falling within an envelope 4 which is narrow and has a high peak value because of the limited area for absorbing the load.

Figure 2:
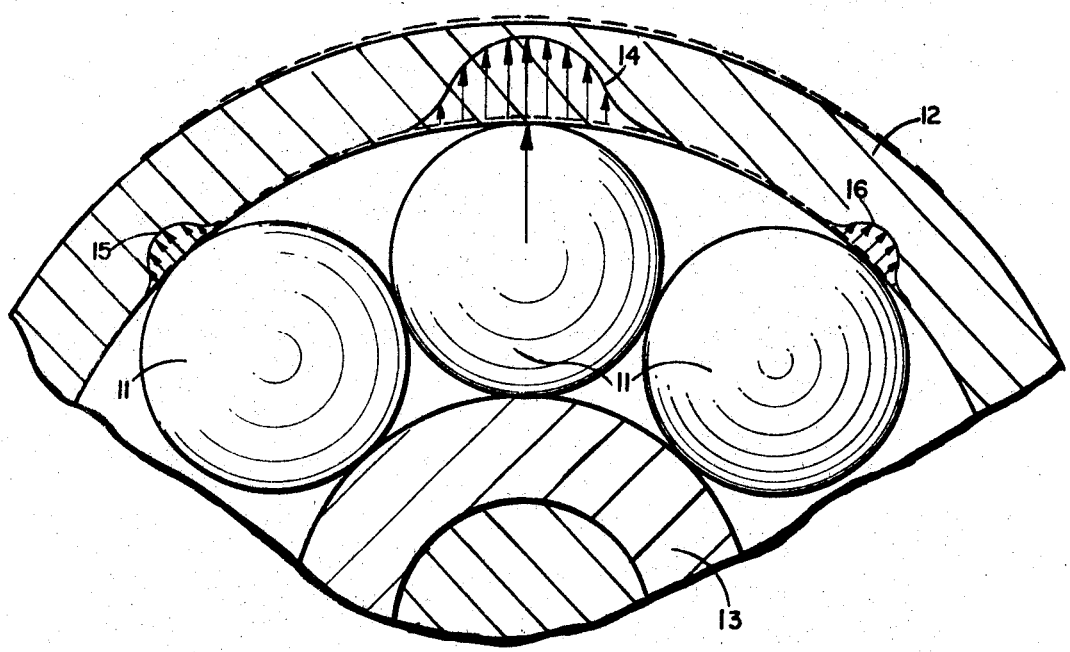
FIG. 2 is a schematic view of a ball bearing assembly constructed in accordance with the present invention showing the new Hertzian stress distribution.

With reference to FIG. 2, the fundamental concept of the present invention may be more clearly understood. FIG. 2 shows the stress distribution that is possible when one or both of the races of the bearing is permitted to deflect ever so slightly to thereby distribute the load over a greater volume of the race material. In FIG. 2, there is shown a plurality of balls 11, an outer race 12 and an inner race 13. If outer race 12 is permitted to deflect ever so slightly, the stress distribution in the vicinity of the maximum contact point is as shown by envelope 14. Envelope 14 illustrates that the peak stresses have been greatly reduced by distributing the load more evenly. In addition, this slight deflection permits the adjacent balls to assume a proportion of the load, as shown by envelopes 15 and 16. This further reduces the stresses in the races. The manner in which the races of a bearing may be permitted to deflect is as follows.

Figure 3:
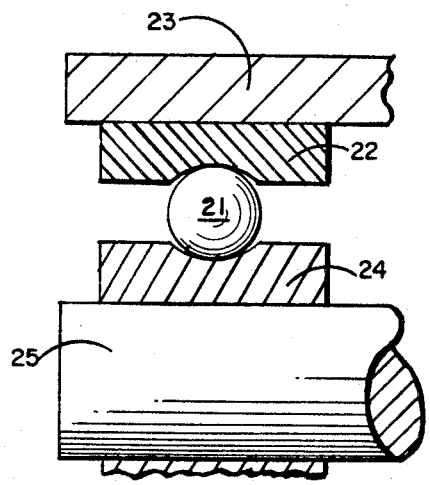
FIG. 3 is a cross sectional view of a prior art ball bearing assembly.
Figure 4:
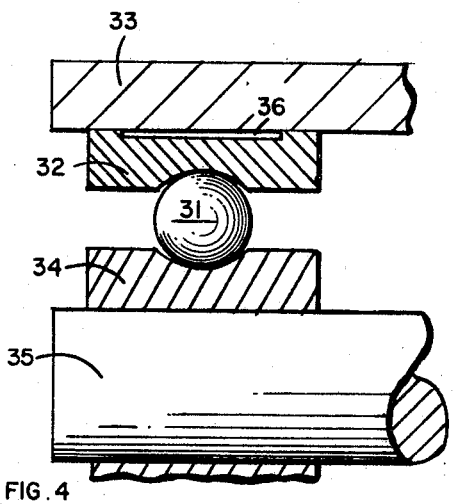
FIGS. 4 and 5 are cross sectional views of ball bearing assemblies constructed in accordance with the teachings of the present invention.

FIG. 3 shows a cross section of a conventional ball bearing assembly which includes a ball 21, an outer race 22 rigidly connected to a housing 23 and an inner race 24 rigidly connected to a shaft 25. FIG. 4 shows a cross section of a bearing constructed in accordance with the present invention which includes a ball 31, an outer race 32 rigidly connected to a housing 33 and an inner race 34 rigidly connected to a shaft 35. However, in FIG. 4, outer race 32 is permitted to deflect under load by providing it with a channel 36 around the entire periphery at the outer extremity thereof. In this manner, a relief is provided between outer race 32 and housing 33 so that race 32 is permitted to bend and flex rather than being restrained to deform in elastic compression as in a conventional bearing, as in FIG. 3.

Figure 5:
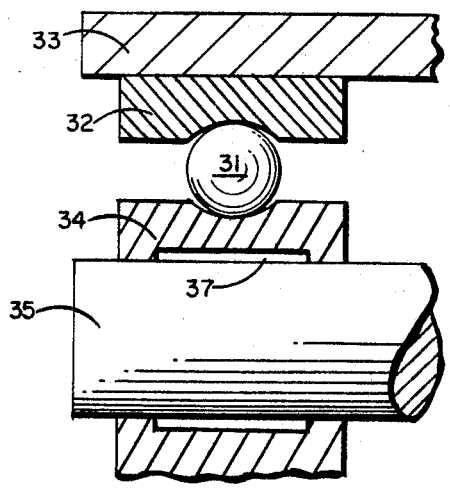

FIG. 5 shows a bearing which is similar to that of FIG. 4 except that in the FIG. 5 embodiment, inner race 34 is provided with a channel 37 so as to provide a relief between inner race 34 and shaft 35. In either case, the same result is obtained.

Figure 6:
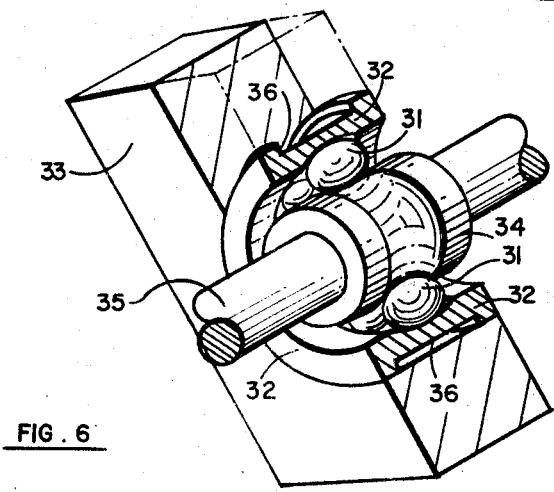
FIG. 6 is a perspective view of the ball bearing assembly of FIG. 4.

FIG. 6 is a perspecive view of the ball bearing assembly shown in FIG. 4, partially in section, which shows more clearly the manner in which channel 36 extends around the entire periphery of race 32. In all of the embodiments of the present invention to be set forth hereinafter, it should be understood that the channel always extends around the entire circumference of the bearing. If this was not the case, the stresses would not be relieved in areas where no relief was provided, defeating the objects of the present invention.

Figure 7:
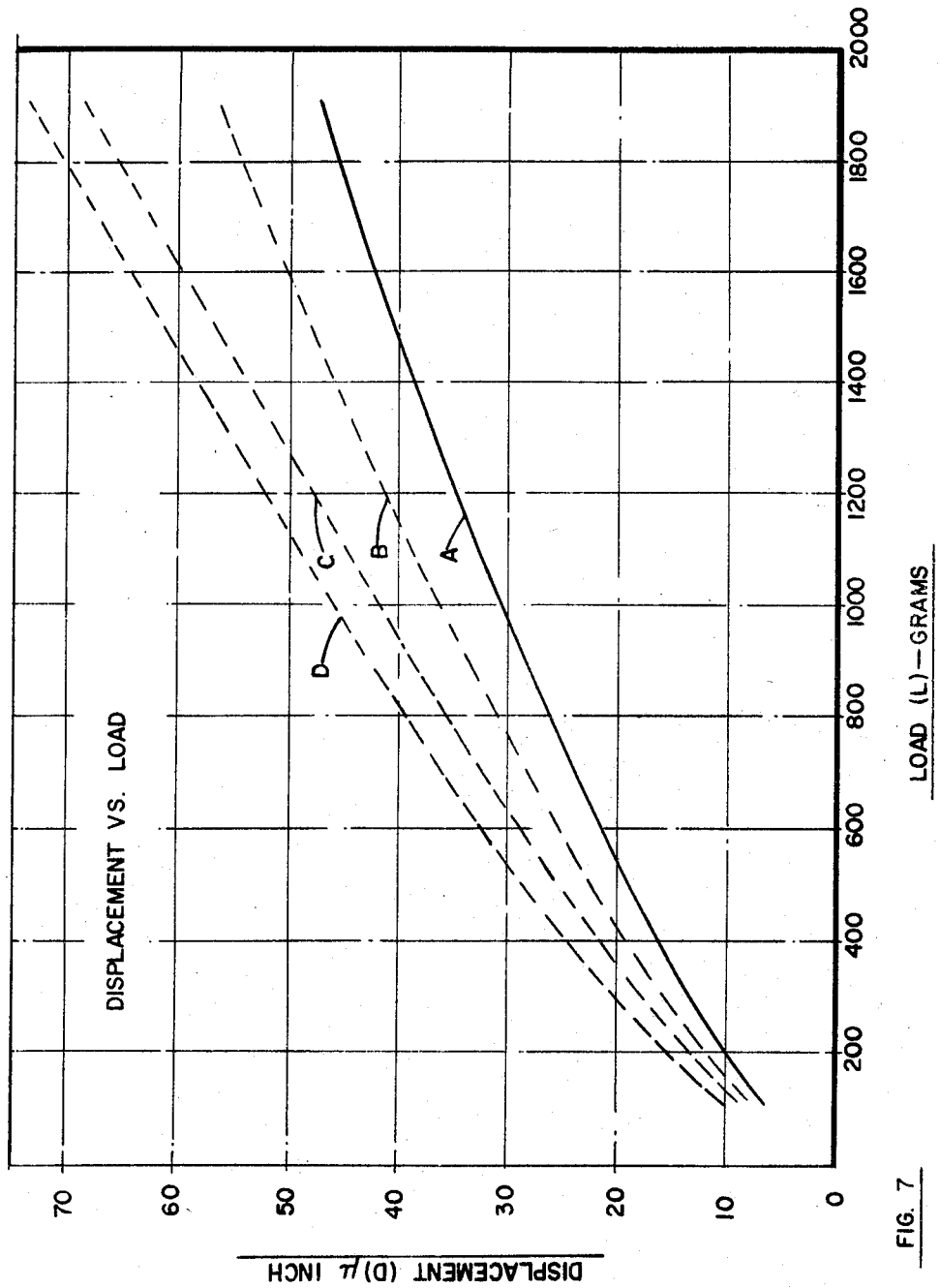
FIG. 7 is a family of curves showing the displacement of the ball in a ball bearing as a function of the load on the ball.
Figure 8A:
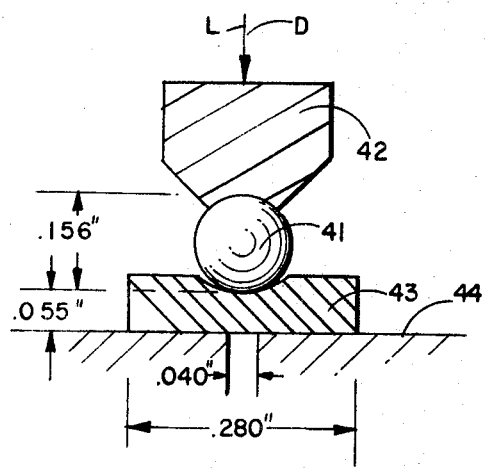
FIGS. 8a through 8d show the several raceway configurations used to derive the family of curves shown in FIG. 7.
Figure 8B:
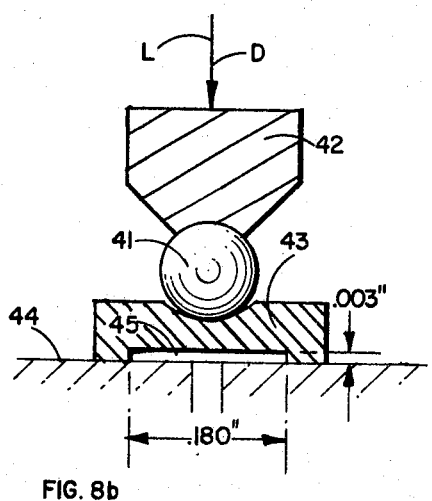
Figure 8C:
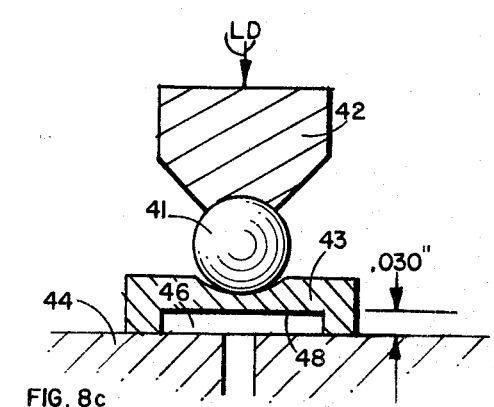

Referring now to FIG. 7 there is shown a family of curves showing the displacement of the ball in a ball bearing assembly as a function of the load on the ball for several different race configurations to show the effect of relief in the outer or inner race. The curves of FIG. 7 were derived by performing tests on four different types of races as shown in FIGS. 8a, 8b, 8c and 8d. In FIG. 8a, a solid ball 41 is shown connected to a test fixture 42. A solid race section 43 is coupled to a fixed housing 44. As shown in FIG. 8a, the thickness of race section 43 below ball 41 is .055 inches whereas the diameter of ball 41 is .156 inches. The tests were conducted so as to apply a load L to ball 41 to press it into engagement with race 43 and to measure the deflection D of ball 41 as a function of the load. In FIG. 8b, the same configuration is shown with the exception of a small cutout section 45 in race 43. Cutout section 45 is only .003 inches deep, or less than 10% of the thickness of race 43. In FIG. 8c, the same configuration is shown as in FIG. 8a with the exception of a cutout section 46 to the extent of .030 inches of material or slightly more than 50% of the thickness of race 43. Finally, in FIG. 8d the same configuration is shown as in FIG. 8c where .030 inches of material is removed but now cutout section 47 is contoured so that the bottom portion of race 43 follows the contours of the top portion of race 43.

Referring back to FIG. 7, the curves show how the displacement of ball 41 varied as a function of the load thereupon. Curve A shows the load-deflection characteristics for a typical solid race as in FIG. 8a which may be used as a standard of comparison for the remainder of the configurations. Curve B shows the load-deflection characteristics of a race relieved as shown in FIG. 8b. In FIG. 8b, less than 10% of the thickness of race 43 under ball 41 is removed. However, as can be seen from curve B in FIG. 7, a significant change in the load-deflection properties of the race is evident. Curves C and D in FIG. 7 show the load-deflection characteristics of the configurations shown in FIGS. 8c and 8d, respectively. It is to be noted that as more material is removed from race 43, there is a correspondingly greater and greater displacement of ball 41 as the load is increased.

The conclusion to be drawn from the characteristics shown in FIG. 7 is that a bearing race becomes more and more compliant with greater and greater relief of the race. In other words, the surface of the race in contact with the ball is permitted to deflect to a greater extent in the presence of a load than is possible with a solid race as shown in FIG. 8a. Therefore, the stresses in the race are significantly reduced. It is also significant to note that even a slight relief in the race, as is the case in FIG. 8b, where less than 10% of the material in back of the ball is removed, provides a significant increase in compliance as shown in FIG. 7, curve B.

Referring now to FIG. 9, there is shown a series of curves which represent the percentage of total deflection of the raceway surfaces which is transmitted through the race to the backside thereof as a function of the load L on the ball. In other words, referring to FIG. 8c, for example, the ordinate of FIG. 9 represents the deflection of surface 48 on the bottom side of race 43 divided by the deflection of ball 41 as a function of load. Stated another way, the family of curves in FIG. 9 shows how much of the deflection at the top surface of race 43 is transmitted to the bottom surface of race 43 when race 43 is relieved. Stated still another way, the curves in FIG. 9 show the reduction in penetration of ball 41 into race 43 when race 43 is relieved. Curve A in FIG. 9 shows the percentage of deflection as a function of load for the solid race configuration of FIG. 8a. Curve A shows some deflection of the back surface of race 43 which was due, in part, to the .040 inch diameter hole which was drilled in housing 44 so that the deflection of the bottom of race 43 could be measured. However, even at a load of 1900 grams, the percentage of transmitted deflection was only 10%. Curve B in FIG. 9 shows the effect of a relief of only .003 inches in race 43 as in FIG. 8b. With a load of 1900 grams, 45% of the deflection at the top surface of race 43 is transmitted to the back surface of race 43 so that the penetration is reduced to 55% of that in a solid race. Curve C in FIG. 9 shows the effect of a relief of .030 inches as is the case in FIG. 8c. In this case, at a load of 1900 grams, 80% of the deflection of the upper surface of race 43 is transmitted to the back surface 48 of race 43 so that the penetration of ball 41 into race 43 is reduced to 20% of that in a solid race. In other words, by providing relief in accordance with the present invention, the amount of penetration of the ball into the race is substantially decreased. With the penetration decreased the amount which the race must elastically compress is significantly decreased and the level of Hertzian stresses is also decreased. An analytic measure of the extent to which this occurs can be derived from a comparison of FIG. 7 and FIG. 9.

From FIG. 7, curve C indicates that at 1900 grams, the deflection of rotor 41 is 67 microinches. However, from curve C of FIG. 9, it can be seen that 80% of this deflection is transmitted to the back surface 48 of race 43. Therefore, only 20% of the 67 microinches of deflection of race 43 represents compression. In other words, there is an absolute penetration of approximately 14 microinches with the race of FIG. 7c with a load of 1900 grams. Referring back to FIG. 7, curve A indicates that with the same load, the deflection of rotor 41 into the solid race configuration of FIG. 8a is 47 microinches. Since substantially none of this penetration is taken up by the back surface of race 43 with no relief provided, there is, in fact, 47 microinches of absolute penetration. Therefore, comparing the penetration in the case of the race of FIG. 8c with that of a solid race as in FIG. 8a, two-thirds of the penetration has been eliminated. The level of Hertzian stresses is proportional to the amount of penetration. From empirical data, it can be shown that a two-thirds decrease in penetration into a race reduces the Hertzian stresses by approximately 50%. Since the fatigue life of a bearing is inversely proportional to the Hertzian stresses to the ninth or tenth power, it can be appreciated that this 50% decrease in Hertzian stresses represents an increase in the fatigue life of the bearing of three orders of magnitude.

The discussion to this point has dealt with the amount of thickness reduction of the races under the ball. However, in order to achieve the objects of the present invention, consideration must be given to the width of the relief. In order for a bearing raceway to flex in the manner desired, it must behave as a beam structure rather than as a column under elastic compression. In other words, the ratio of the length of the cutout to the thickness of the material in the race, the fineness ratio, must be such that the portion of the race under the ball flexes as a beam. The exact fineness ratio used in any given case depends upon the particular properties desired of the bearing. Standard beam deflection formulas indicate that as the fineness ratio increases, the flexing of the race increases. For example, in order to derive the data for curve A in FIG. 9, a .040 inch hole was drilled through housing 44 as shown in FIG. 8a. Since the thickness of the material under ball 41 is .055 inches, the fineness ratio is .040/.055 or less than 1. As can be seen from curve A in FIG. 9, such a small fineness ratio is inoperative to provide any significant deflection of race 43 such that race 43 is still acting as a column of material under elastic compression. In FIG. 8b, on the other hand, cutout section 45 in raceway 43 is .180 inches in width. The fineness ratio in this case is approximately 3 allowing for the average thickness through the relieved section of race 43. As can be seen from curve B of FIG. 9, such a fineness ratio is sufficient to cause race 43 to behave as a beam structure. The fineness ratio necessary for the characteristics of a block of material to be converted from those of elastic compression to those of a beam structure is not well defined in stress analysis literature. In the last analysis, the particular fineness ratio used in any give case, as indicated above, depends upon the particular properties desired of the bearing. A fineness ratio of at least 2/1 is preferred as a minimum figure.

Figure 8D:
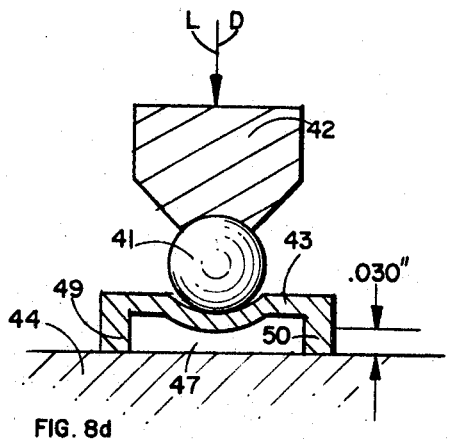
Figure 10:
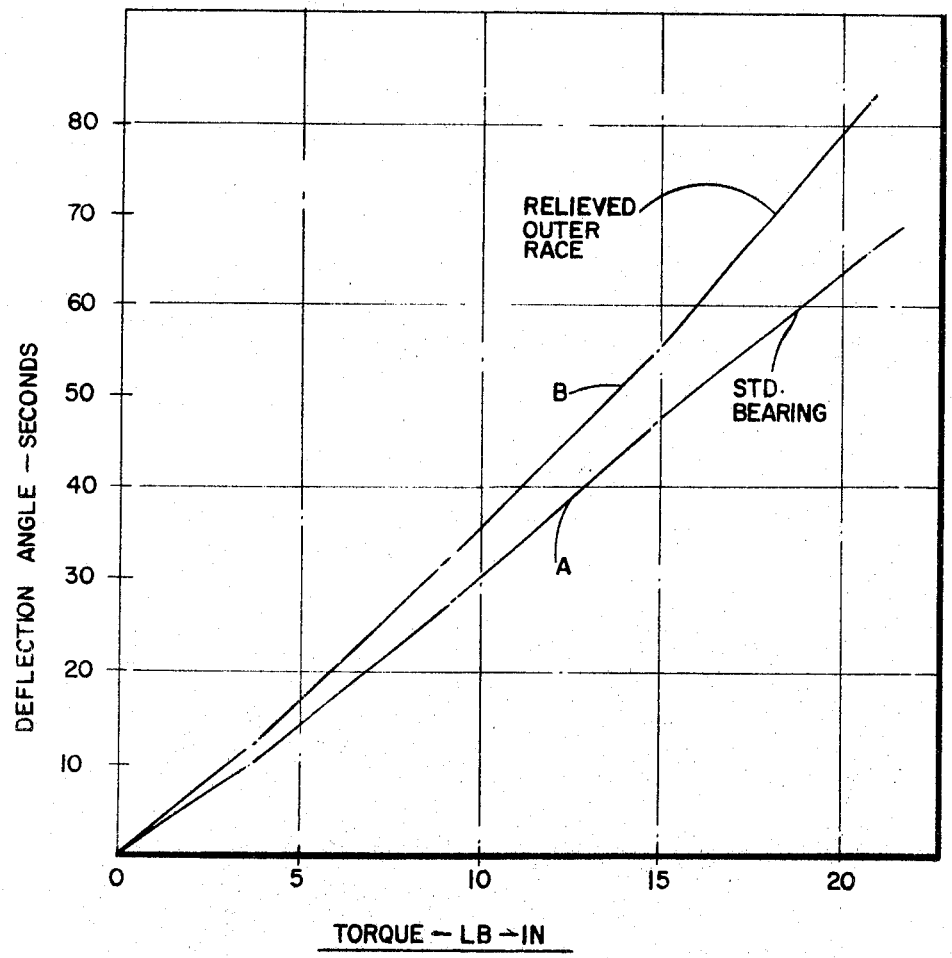
FIG. 10 is a family of curves showing the deflection of the shaft as a function of applied loads for a standard duplex paired bearing and for the same bearing relieved in accordance with the present invention.

It might seem that constructing a bearing as shown in FIGS. 8b through 8d, so as to permit flexural bending of the races, would result in a bearing which is less stiff such that the shaft would show a significant increase in deflection as a function of applied load. However, it has been determined that this is not the case. Referring now to FIG. 10, there is shown a family of curves indicating the deflection angle of a shaft as a function of load on the shaft. The bearing configuration used for the test was a duplex paired bearing with a preload of 8 pounds. Curve A in FIG. 10 is for a conventional duplex paired bearing with races constructed as shown in FIG. 8a. Curve B in FIG. 10 is for a bearing with races provided with maximum relief as shown in FIG. 8d. The test results shown in FIG. 10 indicate that under an equivalent load of 200g's, the shaft supported by the relieved bearings deflected only 10% more than was the case with the shaft supported by the conventional bearings. As a result, it can be seen that although there is a slight increase in the flexibility of the shaft as a result of relieving the bearing, the increased flexibility is not significant.

It will be apparent to those skilled in the art that many possible configurations are possible in order to achieve the objects of the present invention. At one extreme, the configuration shown in FIG. 8b can be employed with a minimum amount of material removed. At the other extreme is the configuration shown in FIG. 8d in which a maximum amount of material is removed from race 43 so as to leave a thin, contoured, race section. With a configuration such as that shown in FIG. 8d, a maximum amount of flexural bending is permitted and the Hertzian stresses in the races are at a minimum. However, one disadvantage to a configuration such as that shown in FIG. 8d is that the removal of the material from the back of race 43 also removes lateral support from end flanges 49 and 50. In order to prevent fracturing of flanges 49 and 50 when the bearing is preloaded and under operating conditions, configurations such as those shown in FIG. 11 or FIG. 12 may be used.

Figure 11:
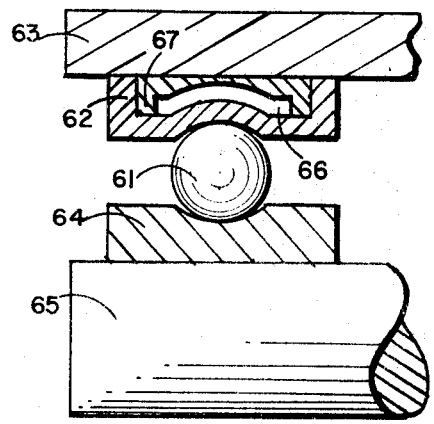
Figure 12:
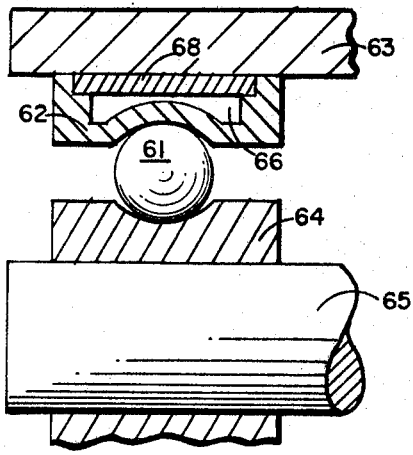

FIG. 11 shows a cross section of a ball bearing assembly which includes a ball 61, an outer race 62 rigidly connected to a housing 63 and an inner race 64 rigidly connected to a shaft 65. Outer race 62 is provided with a channel 66 in which a maximum amount of material is removed as is the case in FIG. 8d. However, in FIG. 11, a collar 67 is inserted along the outer rim of race 62 to provide lateral support for outer race 62. In FIG. 12, a second type of collar 68 is shown to provide lateral support for outer race 62.

Figure 13:
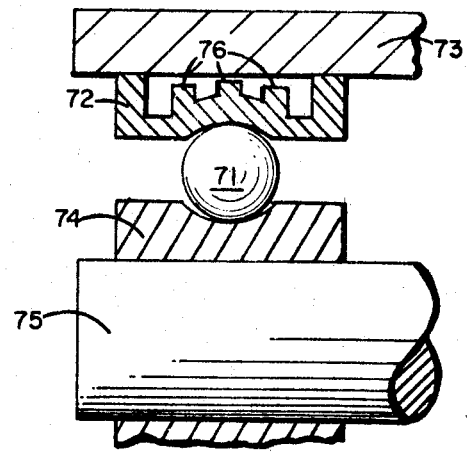
FIGS. 11–14 are cross sectional views of several embodiments of ball bearing assemblies constructed in accordance with the teachings of the present invention.
Figure 14:
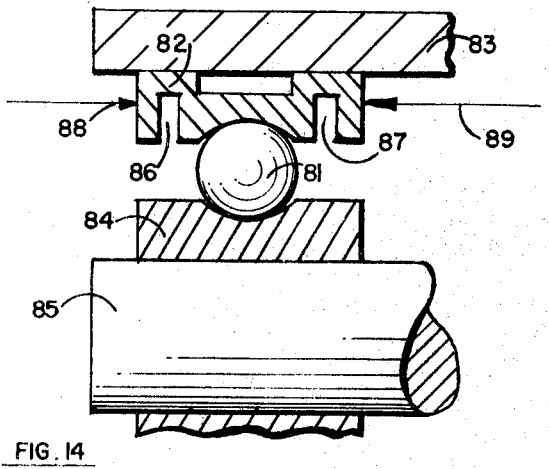

Still other possible configurations are shown in FIGS. 13-14. In FIG. 13, the bearing assembly includes a ball 71, an outer race 72 rigidly connected to a housing 73 and an inner race 74 rigidly connected to a shaft 75. The embodiment of FIG. 13 is very similar to that of FIG. 8d but instead of removing substantially all of the material in back of outer race 72, as is done with race 43 in FIG. 8d, only a portion of the material is eliminated in the embodiment of FIG. 13 so as to leave a plurality of teeth 76. This configuration permits substantially the same degree of bending as in the embodiment of FIG. 8d but provides added strength to outer race 72.

The FIG. 14 embodiment includes a ball 81, an outer race 82 rigidly connected to a housing 83 and an inner race 84 rigidly connected to a shaft 85. Outer race 82 is constructed with a minimum of material directly in back of ball 81 to permit flexural bending of race 82. In addition, slots 86 and 87 cut into outer race 82 permit bending of outer race 82 when subjected to loads in a direction indicated by arrows 88 and 89 as is encountered when preloading a bearing.

Figure 15:
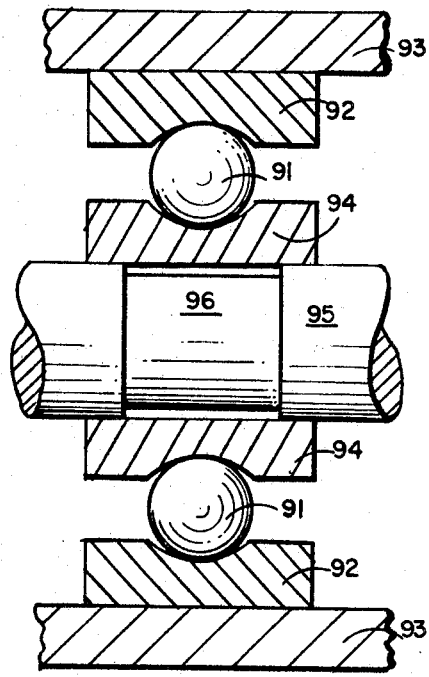

In all of the configurations of the present invention shown heretofore, it has been indicated that either the inner or outer race may be relieved to permit flexural bending thereof. However, the same principles are applicable if the shaft or the housing has a portion of the material cut away to provide relief. For example referring to FIG. 15 there is shown a bearing configuration which includes a plurality of balls 91, an outer race 92 rigidly connected to a housing 93 and an inner race 94 rigidly connected to a shaft 95. In FIG. 15, shaft 95 is provided with a reduced diameter section 96. In this manner, relief is provided for inner raceway 94 without physically removing any material therefrom.

Figure 16:
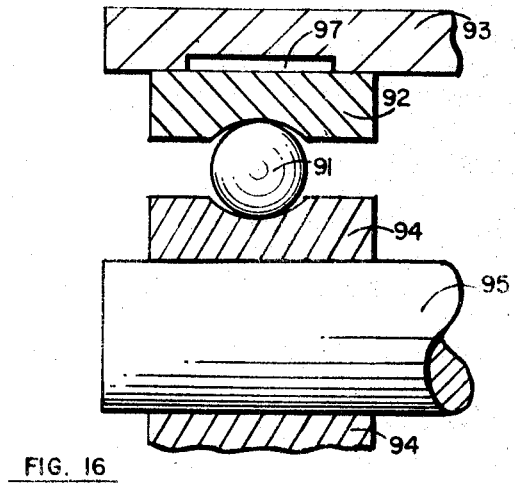
FIGS. 15 and 16 are sectional views of ball bearing assemblies showing how the shaft or the housing may be relieved to achieve the objects of the present invention.

In FIG. 16 instead of relieving inner raceway 94 by providing a relief on shaft 95, relief is provided for outer raceway 92 by providing a channel 97 in housing 93. The effect is the same.

Figure 17:
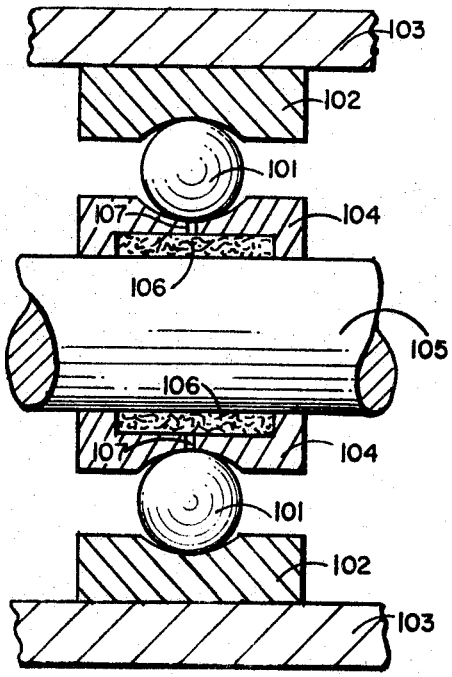
FIG. 17 is a cross sectional view of a ball bearing assembly constructed in accordance with the teachings of the present invention showing how lifetime lubrication may be provided for the bearing.

An additional advantage that is derived when constructing bearings in accordance with the present invention is that continuous lubrication of the ball-raceway surfaces can be provided in sealed systems such as are found in gyroscopes, velocity meters, motors, etc. throughout the life of the device. For example, referring to FIG. 17, there is shown a bearing constructed in accordance with the present invention including a plurality of balls 101, an outer race 102 rigidly connected to a housing 103 and an inner race 104 rigidly connected to a shaft 105. In the case of the FIG. 17 embodiment, inner race 104 is provided with a channel 106 to relieve inner race 104 so as to reduce the level of Hertzian stresses therein. The presence of channel 106 in contact with shaft 105 provides a pocket or receptacle for storage of an appropriate lubricant. By providing a plurality of small metering holes 107 which are drilled through inner race 104 in such a fashion that the holes are not in an area contacted by the balls, a small amount of lubricant may be continuously metered into the area where balls 101 contact raceways 102 and 104. The combination of operating temperature, lubricant viscosity, metering method, centrifugal force and gravity will determine the rate of lubricant release. The same principle shown in FIG. 17, which is there applied in the case of inner race rotation, can be applied in the case of outer race rotation where the outer race is relieved as shown in FIGS. 4, 12 and 13, for example. In the case where the lubricant is put into the outer race, however, there will not be the normal centrifugal force to drive the lubricant into the ball-raceway contact area as in the case of FIG. 17. However, even where the outer race is relieved, the centrifugal forces generated by the balls will cause flexure of the outer race and will provide a certain degree of pumping action to drive the lubricant through the orifice down onto the ball. In addition, other forces such as heat, expansion of the lubricant, etc. will contribute to forcing the lubricant down onto the ball. Finally, the lubricant could be placed in the shaft or in the housing if the embodiments of FIG. 15 or 16 were utilized.

When a shaft which is supported by a ball bearing assembly is driven at high speeds, the weight of the individual balls, because of the effect of centrifugal forces, become a contributing factor to the level of the Hertzian stresses. When constructing a bearing in accordance with the teachings of the present invention, however, smaller balls may be used since each ball does not have to assume as great a load due to the load being distributed more evenly. However, with a thin race, as in FIG. 8d, there can be resonance problems in the bearing at high speeds. This is because the resonant frequency of the bearing is a function of the length of the bending member and in a configuration such as is shown in FIG. 8d, there is a large section which bends and, as a result, the resonant frequency can be relatively low. In the FIG. 13 embodiment, however, the effect of providing a plurality of teeth 76 is to increase the natural frequency of the section by dividing the longer section of raceway 72 into a series of shorter sections. In this manner, the resonance problem may be eliminated. Further, the presence of extending annular means 76 defined by groove, the means being of diameter only slightly less than the race-member diameter, increases the structural rigidity and strength of the race in the circumferential direction.

It can therefore be seen that in accordance with the present invention, the Hertzian stresses which are a major limiting factor in the fatigue life of a bearing are significantly decreased by permitting the ball bearing races to absorb energy by bending thereby distributing the load over a greater volume of the race material. Since the fatigue life of a bearing varies inversely as the maximum Hertzian stresses to the ninth or tenth power, it can be appreciated that even a small decrease in the level of the stresses will drastically increase the life of the bearing. In accordance with the present invention, as was shown with respect to the curves of FIGS. 7 and 9, the maximum level of Hertzian stresses are significantly decreased so that the fatigue life of bearings is now almost infinite.

While the invention has been described with respect to several physical embodiments constructed in accordance therewith, it will be apparent to those skilled in the art that various modifications and improvements may be made without departing from the spirit and scope of the invention. For example, in all of the embodiments in which the outer race has been shown relieved, it will be understood that, in fact, the inner race could be relieved in the same manner or both the inner and outer races could be relieved to provide the same result. Similarly, in the cases where the inner race has been shown relieved, the outer race could well have been relieved or both the inner and outer races could have been relieved to achieve the same result.

What is claimed is:

1. A ball bearing loaded within its normal operating range comprising substantially coaxial relatively rotatable inner and outer annular races each formed of substantially incompressible material, said races having relatively thick annular sections adjacent their opposite ends and thinner intermediate annular regions providing opposed annular raceway surfaces on their adjacent faces, said raceway surfaces each being of uniform arcuate cross section in planes radially of said race and coacting to define a toroidal space, a plurality of balls disposed in spaced relation throughout said toroidal space, means providing a circumferential radial support for at least one of said races only in axially spaced annular bands at its said relatively thick annular sections at opposite sides of said toroidal space axially of said bearing, said annular bands defining a circumferential annular space therebetween, the cross sectional area of said thinner intermediate region being substantially greater than the area of said circumferential annular space, whereby said intermediate region of said one race is free to elastically deflect radially under load as an end-supported beam between said annular bands, and means for establishing between said races through the balls interposed therebetween a load transmitting force having at least a radially directed component and of substantially constant magnitude, the magnitude of said force being such that said one race is elastically distorted from its annular configuration in the region of the force applied thereto in a radial direction away from said balls throughout a limited circumferentially extending zone sufficient that the imposed load transferred between said one race and said balls is distributed in significant proportions over a plurality of said balls in all relative positions of said races as said races are relatively rotated under said load.

2. The loaded bearing defined in claim 1 wherein said one race is the inner race.

3. The loaded bearing defined in claim 1 wherein said one race is the outer race.

References Cited

UNITED STATES PATENTS 3,404,925  10/1968  Bailey _____ 308—184

FOREIGN PATENTS 23,460  11/1908  Great Britain.
121,132  11/1918  Great Britain.

MARTIN P. SCHWADRON, Primary Examiner

F. SUSKO, Assistant Examiner